United States Patent [19]
Nishiyama et al.

[11] Patent Number: 5,424,098
[45] Date of Patent: Jun. 13, 1995

[54] METHOD OF MANUFACTURING ORGANIC FILMS USING ORGANIC COMPOUND AND METALLIC COMPOUND

[75] Inventors: Kazuhiro Nishiyama; Norihisa Mino, both of Osaka; Kazufumi Ogawa, Nara, all of Japan

[73] Assignee: Matsushita Electric Industrial Co., Ltd., Osaka, Japan

[21] Appl. No.: 123,102

[22] Filed: Sep. 20, 1993

[30] Foreign Application Priority Data

Oct. 2, 1992 [JP] Japan .................................. 4-264499

[51] Int. Cl.$^6$ .............................................. B05D 1/18
[52] U.S. Cl. .................. 427/352; 427/430.1; 427/435; 427/443.2
[58] Field of Search .............. 427/435, 430.1, 443.2, 427/352

[56] References Cited

U.S. PATENT DOCUMENTS

| | | | |
|---|---|---|---|
| 3,993,835 | 11/1976 | Miedaner | 428/378 |
| 4,761,316 | 8/1988 | Ogawa | 428/64 |
| 4,992,316 | 2/1991 | Ogawa | 428/64 |
| 5,079,600 | 1/1992 | Schnur | 357/4 |
| 5,268,198 | 12/1993 | Yamasaki et al. | 427/226 |

FOREIGN PATENT DOCUMENTS 0466044  1/1992  European Pat. Off. .

OTHER PUBLICATIONS

European Search Report date-stamped Jan. 24, 1994.
Borja et al: Fatty Acids in Layered Meta Hydroxides: Membrane-Like Structure and Dynamics, J. Phys. Chem. 1992, vol. 96, No. 13, pp. 5434-5444.

*Primary Examiner*—Shrive Beck
*Assistant Examiner*—Erma Cameron
*Attorney, Agent, or Firm*—Fish & Richardson

[57] ABSTRACT

A method of manufacturing an organic film comprises dipping and holding a substrate having an active hydrogen atom on its surface in a metallic compound having an electrophilic property or solution of the metallic compound and washing the substrate with a nonaqueous solvent, thereby manufacturing a metallic monomolecular film on the substrate surface, or dipping and holding a substrate having an organic monomolecular film in organic compound or acid anhydride of organic compound or solution dissolving the organic solution, thereby, manufacturing an organic monomolecular film on a metallic compound monomolecular film. According to the method of manufacturing an organic film above mentioned, unlike the Langmuir-Blodgett technique, a complicated operation is not required and contamination of impurity to inside of film is avoided. As a result, a film having a complicated structure can be manufactured on a substrate simply.

10 Claims, 11 Drawing Sheets

METHOD OF MANUFACTURING ORGANIC FILMS USING ORGANIC COMPOUND AND METALLIC COMPOUND

FIELD OF THE INVENTION

The present invention relates to methods of manufacturing organic films in which an organic monomolecular film and an organic laminated film can be manufactured more simply using a wide range of organic compounds. More particularly, a metallic compound having an electrophilic property is adsorbed to a substrate surface and then an organic compound having an active hydrogen atom is adsorbed to the substrate surface, as a result, an organic monomolecular film can be manufactured on the substrate surface. Further, an organic laminated film can be manufactured by selecting the organic compound to be used.

BACKGROUND OF THE INVENTION

The present invention relates to a method of manufacturing an organic monomolecular film and an organic laminated film more simply using a wide range of organic compounds.

There are known techniques for manufacturing an organic film, including the Langmuir-Blodgett technique and a chemical adsorption method.

The Langmuir-Blodgett method comprises dissolving an amphipathic organic molecule in redistilled water 4 contained in square-shaped water tank 1 of apparatus for manufacturing a film using the Langmuir-Blodgett method as shown in FIG. 8 and dropping the solution above mentioned and manufacturing a gaseous film onto the surface of the redistilled water 4. The gaseous film is pressed by using a barrier 2 having a weight sufficient to produce a condensed film on the surface of the redistilled water 4, and a cleaned substrate 5 is dipped in the condensed film and picked up by using equipment for moving the substrate up and down 6. As a result, a monomolecular film can be manufactured on substrate surface 5. A laminated film can be manufactured by repeating the process above mentioned.

As shown in FIG. 9, an amphipathic molecule 9 has a hydrophobic portion 7 and a hydrophilic portion 8. A condensed film can be manufactured by pressuring the amphipathic molecule 9 using barrier 2 as shown in FIG. 10.

A laminated film containing amphipathic molecule 9 as shown in FIG. 13 can be manufactured by moving a substrate 5 up and down as shown in FIG. 11 and FIG. 12.

The chemical adsorption method of the prior art comprises dipping a substrate having —OH groups on its surface in a solution of an organic compound having a chlorosilyl group at the molecular end, taking out the substrate from the solution to wash it with solvent, and treating it with water. As a result, a monomolecular film can be manufactured on a substrate surface. A laminating method known in the prior art comprises repeating the procedure above mentioned.

However, in the Langmuir-Blodgett technique of the prior art, there are some problems: only a substrate having a planar shape can be used, in manufacturing film, prevention of impurity contamination is needed, operation is complicated, and only an amphipathic molecule can be used as the adsorbed molecule.

Further, in the chemical adsorption method of the prior art, an organic compound having a chlorosilyl group at a molecular end is used as adsorbent, but there are few such organic compounds having chlorosilyl groups at molecular ends, so the kind of organic films which can be made are very limited.

SUMMARY OF THE INVENTION

It is hence a primary object of the invention to present a method of manufacturing an organic film simply using a wide range of organic compounds in order to solve the problems of the prior art.

To achieve the above object, the method of manufacturing an organic film of the invention is a method of manufacturing an organic film comprising the following procedure:

holding and dipping a substrate having active hydrogen atoms on its surface in an electrophilic metallic compound solution, washing the substrate with a non-aqueous solvent, and forming a monomolecular film of the electrophilic metallic compound on the substrate surface, holding and dipping the substrate having the monomolecular film of the electrophilic metallic compound thereon in at least one liquid organic compound selected from the group consisting of (1) organic liquid compounds having at least one active hydrogen atom, (2) acid anhydrides of said organic compounds, (3) a solution of said organic compound having an active hydrogen atom and (4) a solution of said acid anhydride of said organic compound, and forming an organic monomolecular film on the surface of the monomolecular film of the metallic compound.

It is preferable in this invention that the organic compound is selected from at least one of carboxylic acids, organic phosphoric acid and sulfonic acids.

It is preferable in this invention that the electrophilic metallic compound solution is dissolved in a nonaqueous solution.

It is preferable in this invention that the substrate having an active hydrogen atom has at least one group selected from —OH group, >NH group, —NH$_2$ groups —COOH group and —SH group on its surface.

It is preferable in this invention that the electrophilic metallic compound is selected from halides, hydroxides, alkyl compounds and alkoxy compounds.

It is preferable in this invention that the metallic component of electrophilic metallic compound is selected from at least one of germanium (Ge), tin (Sn), titanium (Ti), zirconium (Zr), hafnium (Hf) and samarium (Sm).

Another object of the invention is provide a method of manufacturing an organic film comprising dipping and holding a substrate having an active hydrogen atom on its surface in a solution of an electrophilic metallic compound, washing the substrate with a non-aqueous solvent, forming a monomolecular film of the metallic compound, holding and dipping the substrate having the monomolecular film of the electrophilic metallic compound thereon in at least one liquid organic compound selected from the group consisting of (1) organic liquid compounds having at least one active hydrogen atom, (2) acid anhydrides of said organic compounds, (3) a solution of said organic compound having an active hydrogen atom and (4) a solution of said acid anhydride of said organic compound, and forming an organic monomolecular film on said surface of the monomolecular film of said metallic compound.

These steps are then repeated at least two times.

It is preferable in this invention that the organic compound is selected from dicarboxylic acids, organic diphosphoric acids and disulfonic acids.

It is preferable in this invention that the electrophilic metallic compound is dissolved in a nonaqueous solvent.

It is preferable in this invention that the substrate having an active hydrogen atom has at least one group selected from —OH group, >NH group, —NH$_2$ group —COOH group and —SH group on its surface.

It is preferable in this invention that the electrophilic metallic compound is selected from halide, hydroxides, alkyl compound and alkoxy compounds of at least one of germanium (Ge), tin (Sn), titanium (Ti), zirconium (Zr), hafnium (Hf), samarium (Sm).

The method of manufacturing an organic film of the invention comprises liquefying (dissolving or melting) an adsorbed molecule, dipping a substrate in the solution above mentioned, chemically reacting the substrate surface and the adsorbed molecule, thereby manufacturing a monomolecular film. As a result, the operation of the method above mentioned is very simple and contamination by impurities such as dust can be avoided. Further, the shape of the substrate is not limited since the organic film can be manufactured simply by contacting the adsorbed molecule and a substrate surface having an active hydrogen atom. Further, in the chemical adsorption method of the prior art, an organic film can be manufactured by reacting an active hydrogen atom of substrate and a halosilyl group of adsorbent. However, in this invention, a metallic compound having an electrophilic property is adsorbed to a substrate surface and then an organic compound is adsorbed thereto. As a result, an organic compound having an active hydrogen atom or an acid anhydride of organic compound can be adsorbed in addition to halosilane.

DETAILED DESCRIPTION OF THE INVENTION

According to the invention, a substrate having an active hydrogen atom on its surface can be used to manufacture an organic film. The usable substrates include glass, alumina, silicon oxide, chromium oxide, stainless steel, mica, silicon, polyurethane, polyamide, ceramics having on the surfaces >NH groups, —NH$_2$ groups, —COOH groups, OH groups, —SH groups, metal, metallic oxide, fiber and resin.

Metallic compounds having an electrophilic property include halides, hydroxides, alkyl compounds and alkoxy compounds of germanium (Ge), tin (Sn), titanium (Ti), zirconium (Zr), hafnium (Hf) and samarium (Sm). A substrate is dipped and held in these compounds, or in a solution of these compounds, so that a metallic atom is attacked by an oxygen atom on the substrate surface because the metallic atom has a strong electrophilic property. As a result, a dehalogenated hydrogen reaction is carried out on a halogenated compound, a dehydration is carried out on a hydroxide, a dealkanation reaction is carried out on an alkyl compound and a dealcoholizing reaction is carried out on an alkoxy compound, thereby bonding a metallic element to the substrate surface.

Figure 1:
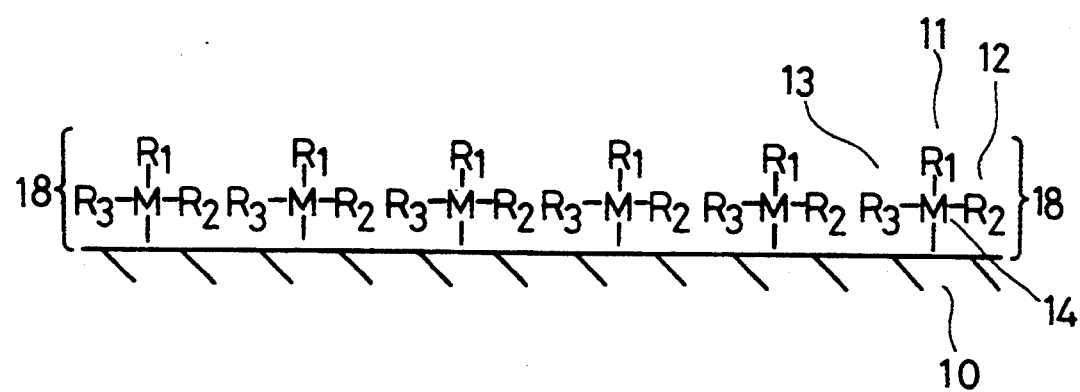
FIG. 1 is a conceptual figure showing a monomolecular film of metallic compound manufactured on a substrate surface of one example of the invention.

Then, the substrate is washed with nonaqueous solvent to remove unreacted metallic compound, thereby forming a metallic monomolecular layer 18 on the substrate surface 10 as shown in FIG. 1. The monomolecular film is bonded with metallic element 14 and has substituted groups 11, 12 and 13.

Figure 2:
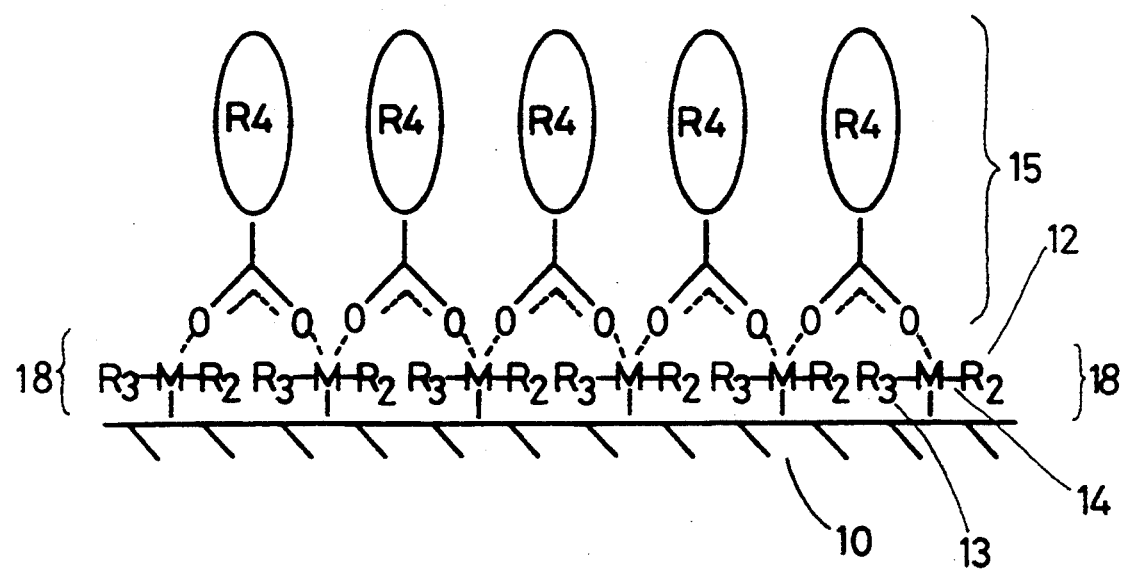
FIG. 2 is a conceptual figure showing an organic monomolecular film manufactured on a substrate surface of one example of the invention.

Further, a substrate on whose surface the metallic monomolecular layer 18 is manufactured is dipped and held in an organic compound or compounds having an active hydrogen atom such as carboxylic acids, organic phosphoric acids, sulfonic acids, alcohols, aldehydes, thiols and amines, or acid anhydrides of organic compounds or solutions of these organic compounds. As a result, the oxygen atoms of these organic compounds and metallic atoms formed on the substrate surface interact intensely and these organic compounds are bonded with metallic element on the substrate surface; thereby an organic monomolecular film 15 is manufactured on the substrate surface as shown in FIG. 2. Carboxylic acids, organic phosphoric acids, sulfonic acids, carboxylic acid anhydrides, organic phosphoric acid anhydrides and sulfonic acid anhydrides are preferred, as they react highly and are stable after being adsorbed.

Figure 3:
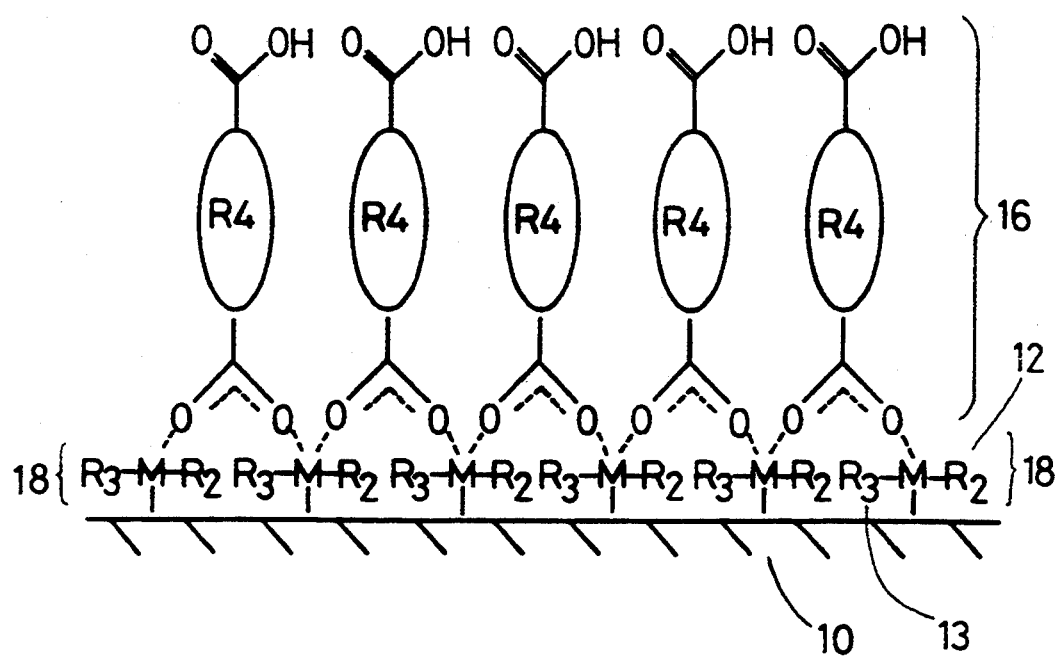
FIG. 3 is a conceptual figure showing an organic monomolecular film on a substrate surface in an organic laminated film of another example of the invention.

An organic monomolecular film 16 having an active hydrogen atom on its surface can be manufactured as shown in FIG. 3 by using bivalent organic compounds such as acid, alcohol, thiol, amine and acid anhydride of organic compound instead of using the monovalent organic compounds above mentioned.

Figure 4:
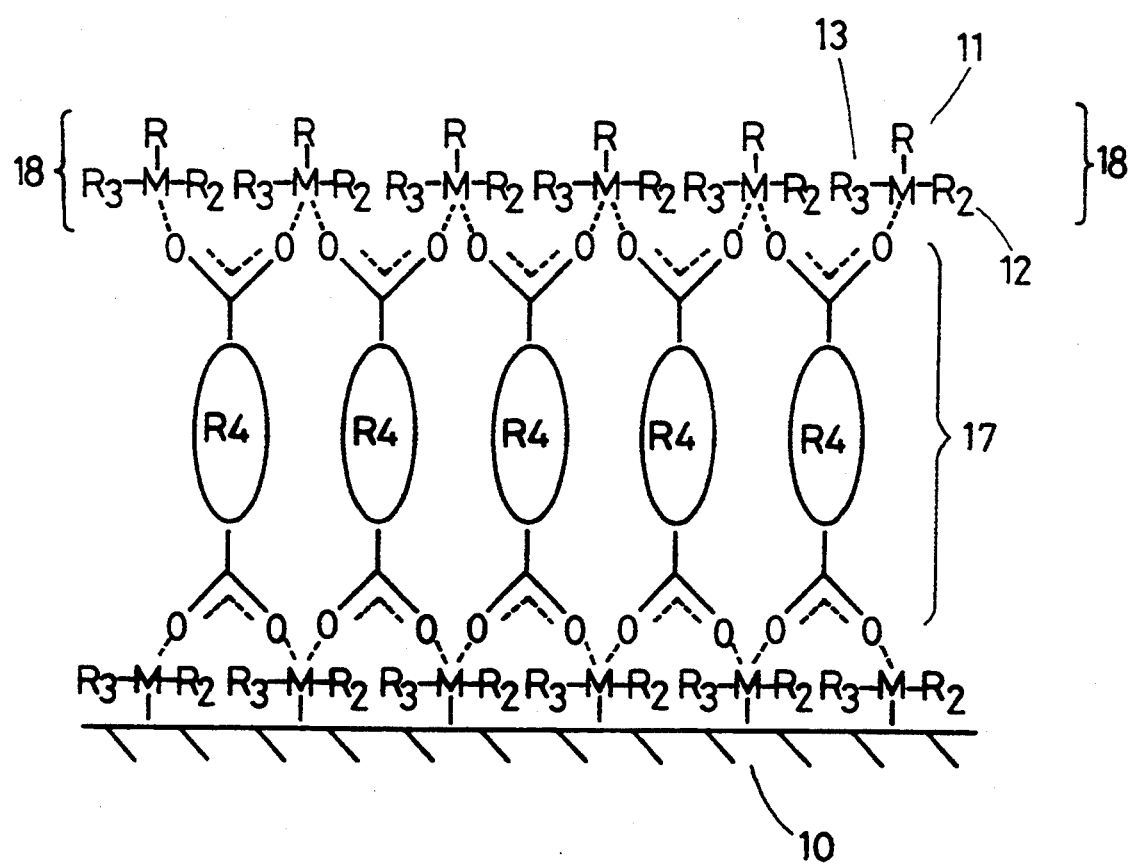
FIG. 4 is a conceptual figure showing a metallic monomolecular film manufactured on a surface of an organic monomolecular film in an organic laminated film of another example of the invention.
Figure 5:
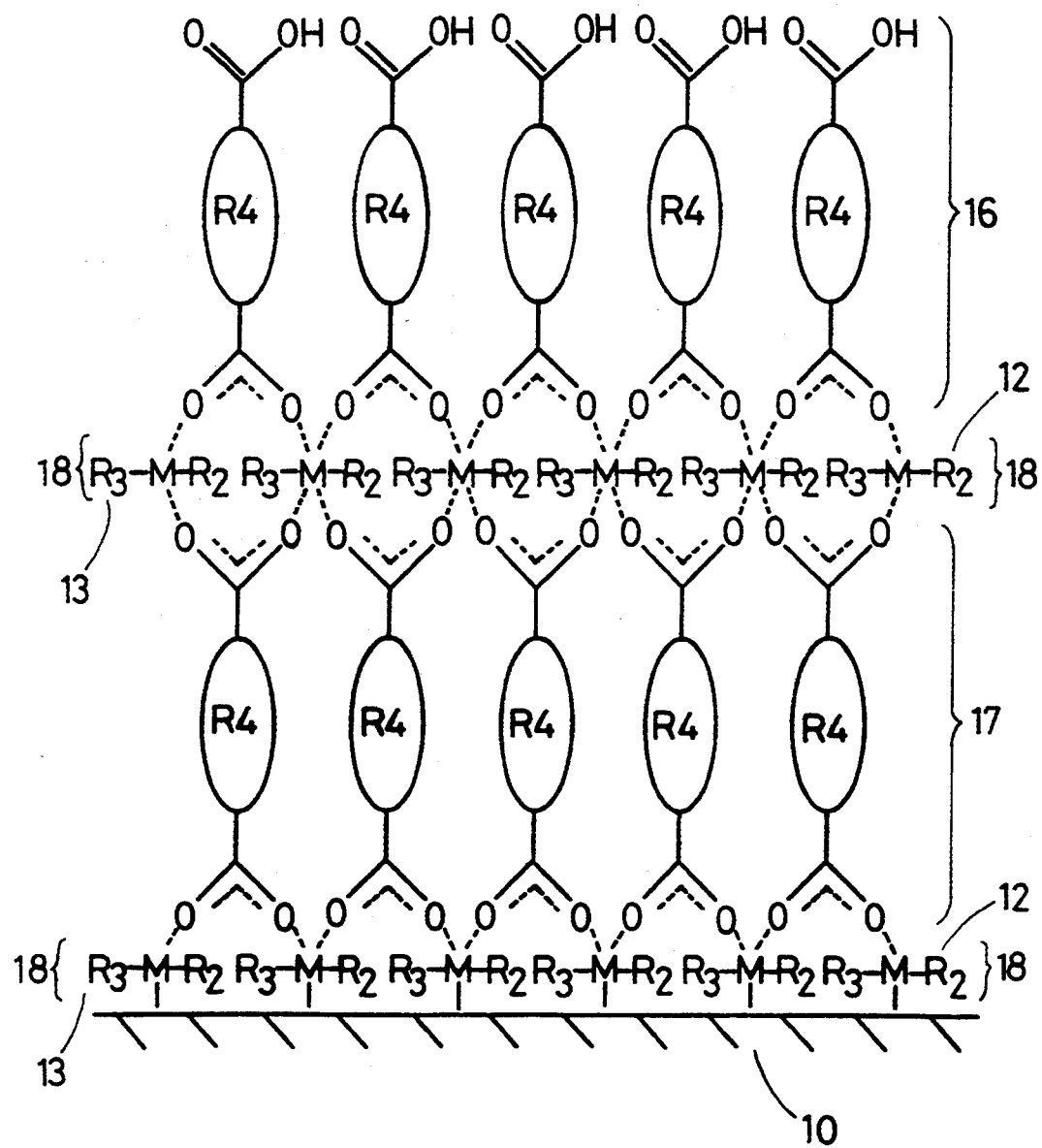
FIG. 5 is a conceptual figure showing an organic laminated film of another example of the invention.
Figure 6:
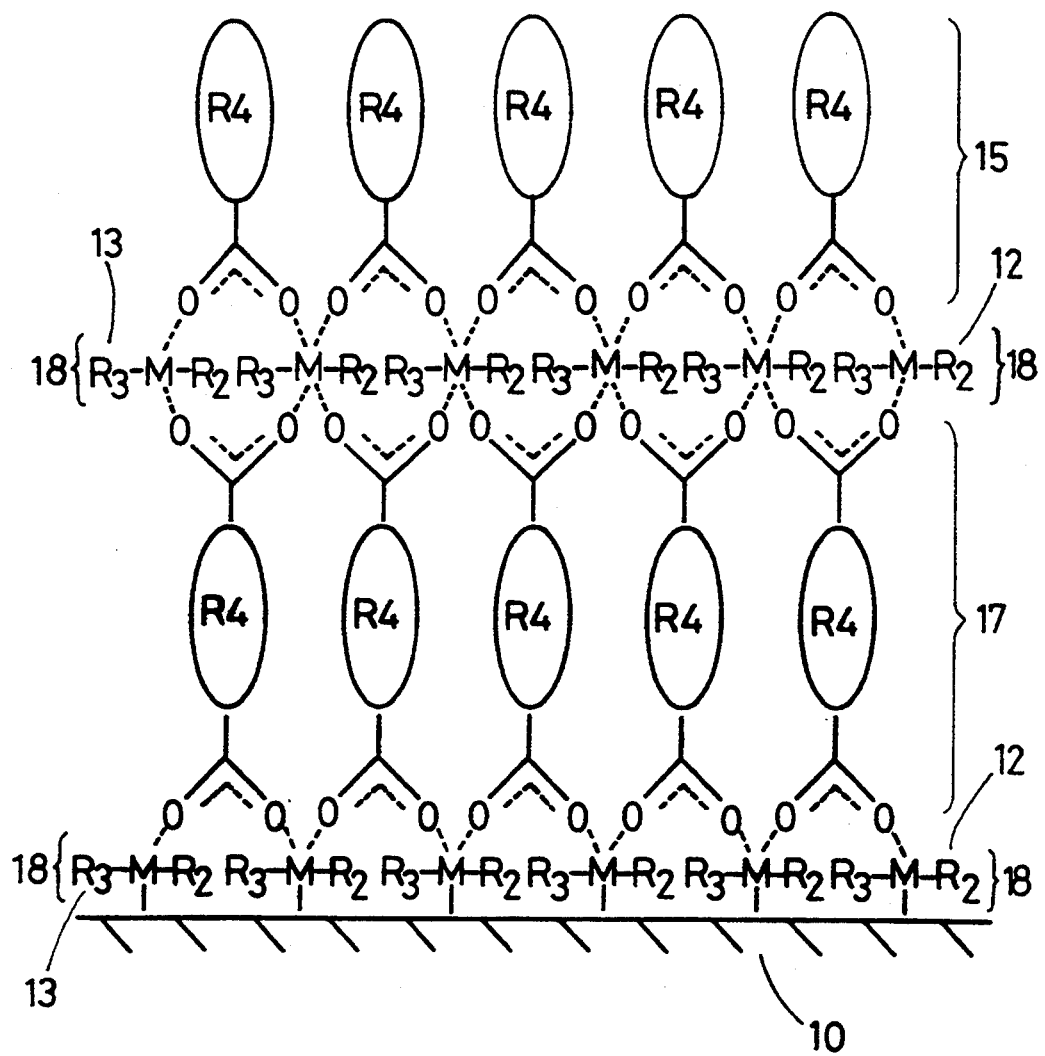
FIG. 6 is a conceptual figure showing an organic laminated film of another example of the invention.

Further, a metallic monomolecular film 18 can be manufactured on a surface of organic monomolecular film 17 as shown in FIG. 4 by dipping and holding the substrate in metallic compound having an electrophilic property such as germanium (Ge), tin (Sn), titanium (Ti), zirconium (Zr), hafnium (Hf) and samarium (Sm) hydroxides halide, alkyl compounds and alkoxy compounds or solutions of these compounds. An organic laminated film 16 or 15 having an metallic atom inbetween can be manufactured as shown in FIG. 5 or FIG. 6 by repeating the procedures above mentioned. In these Figs, carboxylic acid is used as organic compound, however, organic phosphoric acid, sulfonic acid, alcohol, thiol, amine and acid anhydride of organic compound can be used.

The concentration of the adsorbing solution in adsorbing a metallic monomolecular film and an organic monomolecular film and reactive temperatures and adsorption times will be described.

The concentration of adsorbing solution is not limited as long as an adsorbent can be dissolved in adsorbing solvent. However, high concentrations of adsorbing solution make it to be difficult to wash the substrate and low concentrations of adsorbing solution make it require a very long adsorption time. Therefore, concentrations of 1.0 mol/l to $1.0 \times 10^{-5}$ mol/l are most preferable.

A reaction temperature of 0°-60° C. is most preferable for adsorption.

The adsorption time required depends on the sort of adsorbent and the concentration of the adsorbing solution. For example, a film which has a satisfactory density can not be manufactured at the lowest concentration in the range above mentioned within a one hour adsorption time. Although there is a long adsorbing time, once a monomolecular film is manufactured on a substrate surface, further reaction is not carried out. Thereby, a 1 to 24 hour adsorption time is most preferable for adsorption.

EXAMPLE 1

Figure 7:
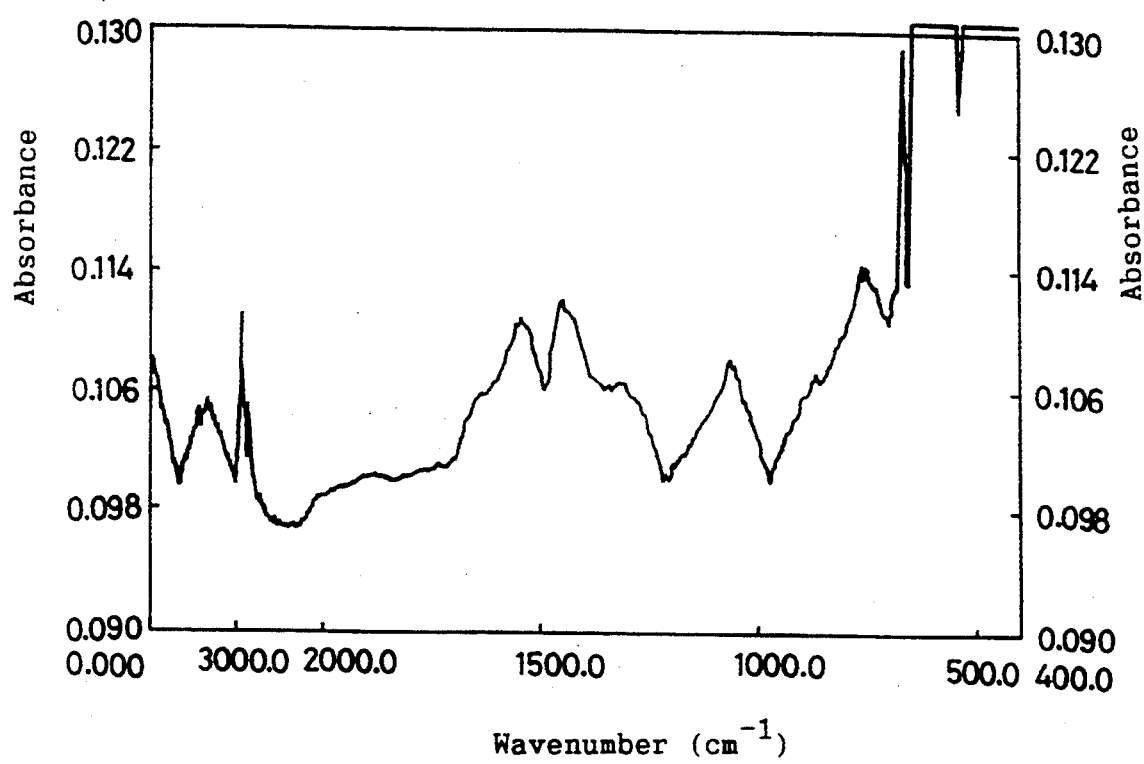
FIG. 7 is an infrared absorption spectrum of an organic monomolecular film of one example of the invention.
Figure 8:
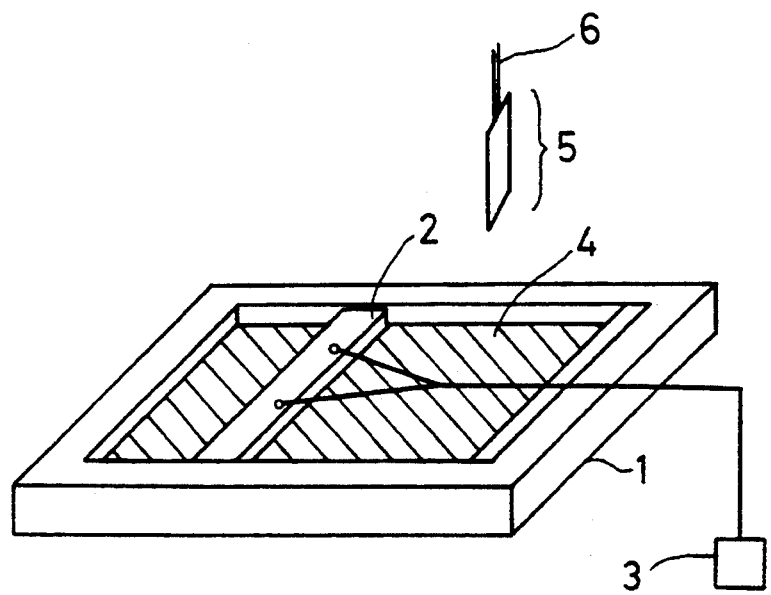
FIG. 8 is a plan view showing a conventional apparatus for manufacturing a Langmuir-Blodgett technique film.
Figure 9:
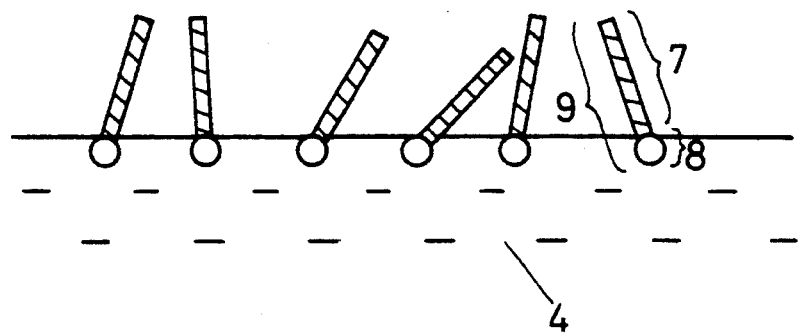
FIG. 9 is a cross section diagram showing a gaseous film formed in manufacturing a Langmuir-Blodgett film according to the conventional method.
Figure 10:
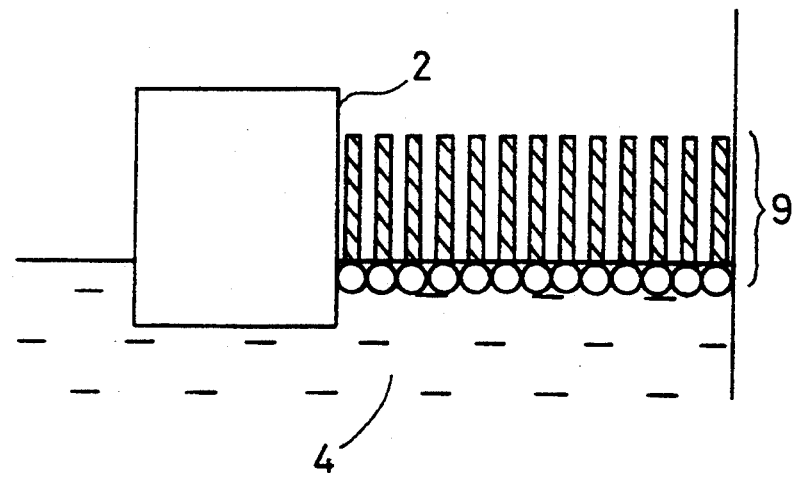
FIG. 10 is a cross section diagram showing a condensed film formed in manufacturing a Langmuir-Blodgett film according to the conventional method.
Figure 11:
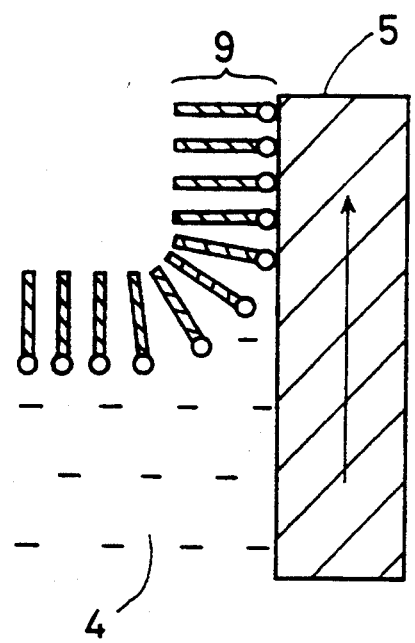
FIG. 11 is a cross sectional view showing a process of manufacturing a film according to the conventional method of manufacturing a Langmuir-Blodgett film.
Figure 12:
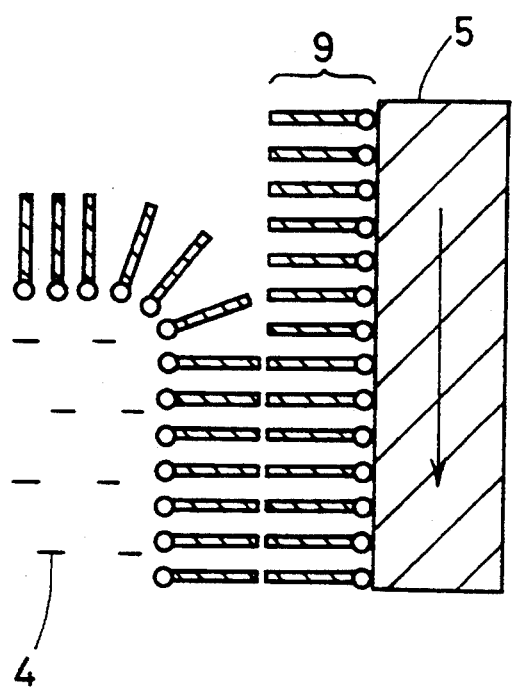
FIG. 12 is a cross sectional view showing a process of manufacturing a laminated film according to the conventional method of manufacturing a Langmuir-Blodgett film.
Figure 13:
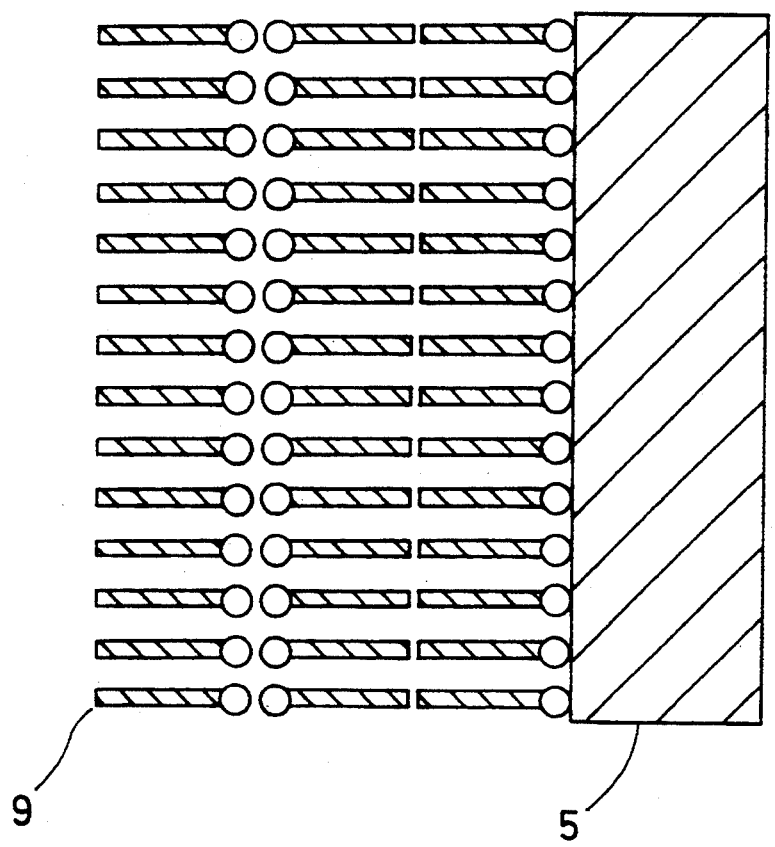
FIG. 13 is a cross sectional view showing a structure of laminated film according to the conventional method of manufacturing a Langmuir-Blodgett film.

A glass substrate of 70.00 mm length, 29.2 mm width, and 1.0 mm thickness was dipped and held in a hexadecane solution of 1.0 vol. % of triisopropoxytitanyl chloride at 25° C. for two hours. Then the substrate was taken out from the solution and washed with hexane three times. Then the substrate was dipped and held in a hexadecane solution of 1.0 vol. % of palmitic acid (including 10 vol % chloroform) at 50° C. for two hours. Then the substrate was taken out from the solution and washed with hexane three times. The substrate was dried in a dry nitrogen atmosphere for one day and measured using the multiple reflection-adsorption method of infrared spectroscopic analysis. As shown in FIG. 7, at wave length 2927 $cm^{-1}$ an adsorption of asymmetrical stretching vibration of methylene was observed and at wave length 2850 $cm^{-1}$ an adsorption of symmetrical stretching vibration of methylene was observed. Further, at wave length 1458 cm and 1640 $cm^{-1}$, a peculiar adsorption of carboxylate was observed. As a result, it was confirmed that a monomolecular film was manufactured.

According to the invention above mentioned, the triisopropoxytitanyl chloride used as the metallic compound was easily adsorbed to the substrate surface, as titanium atoms have an extremely strong oxygen affinity. Further, the adsorbed titanium atoms interacted with palmitic acid to produce a monomolecular film on the substrate surface.

EXAMPLE 2

A glass substrate of 70.00 mm length, 29.2 mm width, and 1.0 mm thickness was dipped and held in a hexadecane solution of 1.0 vol % of di-n-butyltin dichloride at 25° C. for two hours. Then the substrate was taken out from the solution and washed with hexane three times. Then, the substrate was dipped and held in a hexadecane solution (including 10 vol. % of chloroform) of 1.0 vol. % of palmitic acid at 50° C. for two hours. Then the substrate was taken out from the solution and washed with hexane three times. The substrate was dried in a dry nitrogen atmosphere for one day. As a result, an organic monomolecular film 15 as shown in formula in FIG. 2 was formed on substrate 10 via metallic compound monomolecular film 18 composed of metallic element 14 (tin) and substituted group 12, 13 (n-butyl group or chloro group).

According to the invention above mentioned, di-n-butyltin dichloride was used as the metallic compound and was easily adsorbed to a substrate surface because tin atoms have an extremely strong oxygen affinity. Further, the adsorbed tin atoms interacted with palmitic acid to form a monomolecular film on the substrate surface.

EXAMPLE 3

A glass substrate of 70.00 mm length, 29.2 mm width, and 1.0 mm thickness was dipped and held in a hexadecane solution of 1.0 vol. % of triisopropoxytitanyl chloride at 25° C. for two hours. Then the substrate was taken out from the solution and washed with hexane three times. Then, the substrate was dipped and held in a hexadecane solution (including 10 vol. % of chloroform) of 1.0 vol. % of sebacic acid at 50° C. for two hours. Then the substrate was taken out from the solution and washed with hexane three times. The substrate was dried. Then the substrate was dipped and held in a hexadecane solution of 1.0 vol. % of triisopropoxytitanyl chloride at 25° C. for two hours. Then the substrate was taken out from the solution and washed with hexane three times. Then, the substrate was dipped and held in a hexadecane solution (including 10 vol. % of chloroform) of 1.0 vol. % of palmitic acid at 50° C. for two hours. Then the substrate was taken out from the solution and washed with hexane three times. According to the infrared spectroscopic analysis, it was confirmed that an organic laminated film as shown in a formula of FIG. 6 was formed on a substrate surface. The organic laminated film was composed of metallic compound monomolecular film 18 having a substituted group 12, 13 (isopropoxy group) formed on a substrate surface 10, an organic compound monomolecular film 17 (sebacic acid) formed on the metallic compound monomolecular film 18 and an organic compound monomolecular film 15 (palmitic acid) which was formed on the organic compound monomolecular film 17 via metallic compound monomolecular film 18.

According to the invention above mentioned, an organic laminated film was formed on a substrate surface using triisopropoxytitanyl chloride as the metallic compound and sebacic acid (bivalent carboxylic acid) and palmitic acid (monovalent carboxylic acid).

EXAMPLE 4

A glass substrate of 70.00 mm length, 29.2 mm width, and 1.0 mm thickness was dipped and held in a solution of 1.0 vol. % of triisopropoxytitanyl chloride at 25° C. for two hours. Then the substrate was taken out from the solution and washed with hexane three times. Then, the substrate was dipped and held in a hexadecane solution (including 10 vol. % of chloroform) of 1.0 vol. % of sebacic acid at 50° C. for two hours. Then the substrate was taken out from the solution and washed with hexane three times. The substrate was dried. Then the substrate was dipped and held in a hexane solution of 1.0 vol. % of triisopropoxytitanyl chloride at 25° C. for two hours. Then the substrate was taken out from the solution and washed with hexane three times. Then, the substrate was dipped and held in a hexadecane solution (including 10 vol. % of chloroform) of 1.0 vol. % of sebacic acid at 50° C. for two hours. Then the substrate was taken out from the solution and washed with hexane three times. According to the infrared spectroscopic analysis, it was confirmed that an organic laminated film as shown in a formula of FIG. 5 was formed on a substrate surface. The organic laminated film was composed of metallic compound monomolecular film 18 having substituted groups 12, 13 (isopropoxy group) formed on substrate surface 10, an organic compound monomolecular film 17 (sebacic acid) formed on the metallic compound monomolecular film 18 and an organic compound monomolecular film 16 (sebacic acid) which was formed on the organic compound monomolecular film 17 via metallic compound monomolecular film 18.

According to the invention above mentioned, an organic laminated film was formed on a substrate surface using triisopropoxytitanyl chloride as the metallic compound and sebacic acid (bivalent carboxylic acid).

EXAMPLE 5

A polyamide substrate of 70.00 mm length, 29.2 mm width, and 1.0 mm thickness was dipped and held in a "Fluorinert Fx 3252" (manufactured by Sumitomo 3M Co.,) solution of 1.0 vol. % of di-n-butyltin dichloride at 25° C. for two hours. Then the substrate was taken out from the solution and washed with hexane three times. Then, the substrate was dipped and held in a "Fluorinert FX 3252" solution of 1.0 vol. % of palmitic acid at 50° C. for two hours. Then the substrate was taken out from the solution and washed with "Fluorinert FX 3252" three times. The substrate was dried in a dry nitrogen atmosphere for one day.

As a result, an organic monomolecular film 15 as shown in formula of FIG. 2 was formed on substrate surface 10 via a metallic compound monomolecular film 18 composed of metallic element 14 (tin) and substituted group 12, 13 (n-butyl group or chloro group).

According to the invention above mentioned, a monomolecular film was formed on a polyamide substrate surface using di-n-butyltin dichloride as the metallic compound since di-n-butyltin dichloride can be easily adsorbed to substrate because of the extremely strong electrophilic property of tin atoms. The tin atom adsorbed to the substrate interacted with the palmitic acid. As a result, a monomolecular film was formed.

EXAMPLE 6

A glass substrate of 70.00 mm length, 29.2 mm width, and 1.0 mm thickness was dipped and held in a hexadecane solution of 1.0 vol. % of di-n-butyltin dichloride (10 vol. chloroform solution) at 25° C. for two hours. Then the substrate was taken out from the solution and washed with hexane three times. Then, the substrate was dipped and held in a hexadecane solution of 1.0 vol. % of palmitic acid anhydride (including 10 vol. % chloroform) at 50° C. for two hours. Then the substrate was taken out from the solution and washed with hexane three times. The substrate was dried in a dry nitrogen atmosphere for one day.

As a result, an organic monomolecular film 15 as shown in the formula of FIG. 2 was formed on substrate surface 10 via a metallic compound monomolecular film 18 composed of metallic element 14 (tin) and substituted group 12, 13 (n-butyl group or chloro group).

According to the invention above mentioned, a monomolecular film was formed on a substrate surface using di-n-butyltin dichloride as the metallic compound, as di-n-butyltin dichloride can be easily adsorbed to substrate using the extremely strong electrophilic property of tin atoms and the tin atom adsorbed to the substrate interacted with palmitic acid.

According to the invention, a method of manufacturing an organic film comprises dipping and holding a substrate having an active hydrogen atom on its surface in a metallic compound having an electrophilic property or a solution of the metallic compound and washing the substrate with a nonaqueous solvent, thereby manufacturing a metallic monomolecular film on a substrate surface; or dipping and holding a substrate having an organic monomolecular film in an organic compound or an acid anhydride of the organic compound or solution of the organic compound, thereby manufacturing an organic monomolecular film on a metallic compound monomolecular film. According to the method of manufacturing an organic film above mentioned, unlike the Langmuir-Blodgett technique, a complicated operation is not required and contamination by impurity on the inside of the film can avoided. As a result, a film can be easily manufactured on a substrate having a complicated structure. Further, unlike the chemical adsorption method of the prior art, the adsorbent is not limited to an organic compound having a chlorosilyl group at molecular end. Thereby, a wide range of organic compounds can be used and an adsorbent which is handled with care is not required to be used.

The invention may be embodied in other specific forms without departing from the spirit or essential characteristics thereof. The present embodiment is to be considered in all respects as illustrative and not restrictive, the scope of the invention being indicated by the appended claims rather than by the foregoing description and all changes which come within the meaning and range of equivalency of the claims are intended to be embraced therein.

We claim:

1. A method of manufacturing an organic film comprising:
   holding and dipping a substrate having an active hydrogen atom on its surface in an electrophilic metallic compound solution,
   washing said substrate with a non-aqueous solvent, and forming a monomolecular film of said electrophilic metallic compound on said substrate surface,
   holding and dipping said substrate having said monomolecular film of said electrophilic metallic compound thereon in at least one liquid organic compound selected from the group consisting of organic phosphoric acids, sulfonic acids, and acid anhydrides, and forming an organic monomolecular film on said surface of the monomolecular film of said electrophilic metallic compound.

2. A method of manufacturing the organic film according to claim 1, wherein the electrophilic metallic compound solution is a non-aqueous solution.

3. A method of manufacturing the organic film according to claim 1, wherein the substrate having an active hydrogen atom comprises at least one group selected from the group consisting of —OH groups, >NH groups, —NH$_2$ groups —COOH groups and —SH groups on its surface.

4. A method of manufacturing the organic film according to claim 1, wherein the electrophilic metallic compound is selected from the group consisting of halides, hydroxides, alkyl compounds and alkoxy compounds.

5. A method of manufacturing the organic film according to claim 4, wherein the metal of said electrophilic metallic compound is at least one metal selected from the group consisting of germanium (Ge), tin (Sn), titanium (Ti), zirconium (Zr), hafnium (Hf) and samarium (Sm).

6. A method of manufacturing an organic film comprising the steps of:

(a) dipping and holding a substrate having an active hydrogen atom on its surface in an electrophilic metallic compound solution, washing said substrate with a non-aqueous solvent to form a monomolecular film of electrophilic metallic compound on said surface;

(b) holding and dipping said substrate having said monomolecular film of said electrophilic metallic compound thereon in at least one liquid organic compound selected from the group consisting of dicarboxylic acids, organic diphosphoric acids, and disulfonic acids, and (c) forming an organic monomolecular film on said surface of the monomolecular film of said metallic compound, and repeating said steps (a), (b) and (c) at least two times.

7. A method of manufacturing the organic film according to claim 6, wherein the electrophilic metallic compound solution is a nonaqueous solution.

8. A method of manufacturing the organic film according to claim 6, wherein the substrate having an active hydrogen atom has at least one group selected from the group consisting of —OH groups, >NH groups, —NH$_2$ groups, —COOH groups and —SH groups on its surface.

9. A method of manufacturing the organic film according to claim 6, wherein the electrophilic metallic compound is selected from the group consisting of halides, hydroxides, alkyl compounds and alkoxy compounds.

10. A method of manufacturing the organic film according to claim 9, wherein the metal of electrophilic metallic compound is at least one selected from the group consisting of germanium (Ge), tin (Sn), titanium (Ti), zirconium (Zr), hafnium (Hf) and samarium (Sm).

* * * * *